April 3, 1945. H. L. CHISHOLM, JR 2,372,710
HYDRAULIC STEERING MOTOR AND SHIMMY DAMPENER
FOR AIRPLANE LANDING GEAR WHEELS
Filed Dec. 11, 1941 5 Sheets-Sheet 2

Inventor
HARRY L. CHISHOLM, JR.

April 3, 1945.  H. L. CHISHOLM, JR  2,372,710
HYDRAULIC STEERING MOTOR AND SHIMMY DAMPENER
FOR AIRPLANE LANDING GEAR WHEELS
Filed Dec. 11, 1941  5 Sheets-Sheet 5

Inventor
HARRY L. CHISHOLM, JR.

Patented Apr. 3, 1945

2,372,710

UNITED STATES PATENT OFFICE 2,372,710

HYDRAULIC STEERING MOTOR AND SHIMMY DAMPENER FOR AIRPLANE LANDING GEAR WHEELS

Harry L. Chisholm, Jr., Buffalo, N. Y., assignor, by mesne assignments, to Houdaille-Hershey Corporation, Detroit, Mich., a corporation of Michigan Application December 11, 1941, Serial No. 422,486

7 Claims. (Cl. 121—41)

My invention relates to the steering and shimmy control of steering wheels on airplane landing gears, particularly the trailing or nose wheel of three wheeled landing gears.

An important object of the invention is to provide a hydraulically driven device which, under control of the airplane pilot, will hydraulically effect the steering movements of the steering wheel and will at the same time function to hydraulically dampen and control the shimmy movements of the wheel.

A further object of the invention is to provide a hydraulic device for the purpose referred to which receives its hydraulic power from the hydraulic system now generally used on airplanes for control of wing flaps, the retraction of the landing gear, and for other controls and adjustments.

Another important object is to utilize a hydraulic device substantially in the form of a rotary hydraulic shock absorber in which the piston element is connected with the steering wheel and subjected to hydraulic pressure for effecting steering movement of the wheel, with the valve mechanism of the device adjustable by the pilot for selective hydraulic movement of the piston structure and steering movement of the wheels.

Still another object is to provide such arrangement and operation of the valving structure that any attempted shimmying movement of the wheel and the piston structure to which it is connected will result in hydraulic fluid control in the hydraulic device for dampening and stopping the shimmying.

Further objects of the invention are to provide for control of the hydraulic fluid under varying conditions so as to protect the structure against undue strain without interfering with its proper functioning to steer and dampen out shimmying.

All the various features of my invention are embodied in the structure shown on the drawings, in which drawings.

Figure 1:
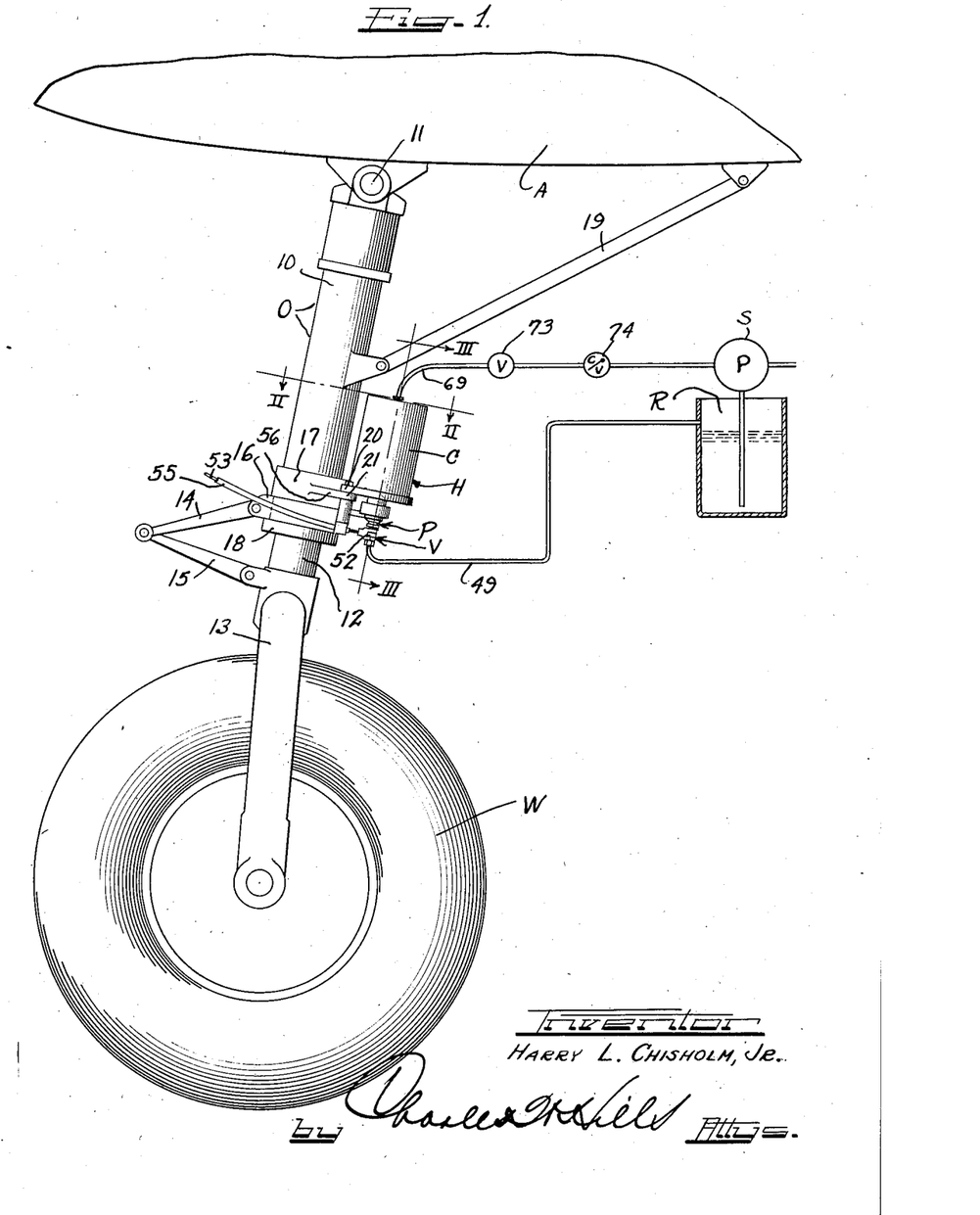
Figure 1 is a side elevation of a steering wheel supporting structure and its connection with an airplane and showing my improved hydraulic device applied thereto.

Referring to Figure 1, A indicates the body structure of an airplane from which extends an oleo strut O whose cylinder member 10 is hinged to the airplane body as indicated at 11 and whose plunger or piston element 12 terminates in a fork 13 journalling the wheel W to be controlled. The oleo strut is well known in the art, the cylinder 10 containing spring means or hydraulic fluid flow resisting means for dampening the movement of the piston or plunger element 12 for absorbing the shock of vertical movement of the wheel W. Upper and lower links 14 and 15 hinged together at their outer ends have their inner ends connected respectively to the fork 13 and to the cylinder element 10, and where the fork supporting plunger element 12 is to be held against rotary movement, the upper link 14 will be secured to the cylinder element against rotary movement relative thereto. However, where the plunger element is to be rotatable, as in connection with my invention, the upper link 14 is pivoted at its inner end to a ring 16 journaled between collars 17 and 18 rigidly secured to the cylinder 10. The strut or brace structure 19 extends between the airplane body and the cylinder 10.

The hydraulic controlling device H for the wheel comprises a cylinder structure C, a piston structure P, and valve structure V. The cylindrical wall 19 of the cylinder structure has at its lower end ears 20 extending therefrom, and the collar 17 secured to the cylinder 10 of the oleo strut has ears 21 to which the ears 20 are secured as by bolts 22 for support of the cylinder structure C of the hydraulic device.

The piston structure P has the shaft 23 extending downwardly out of the cylinder structure and an arm 24 secured to the outer end of the shaft has its outer end connected by a link 25 with the outer end of an arm 26 extending from the ring 16 which is rotatable on the oleo strut cylinder 10. The piston structure of the hydraulic device and the piston or plunger structure 12 of the oleo strut are thus connected to rotate together.

Figures 3, 6, 7:
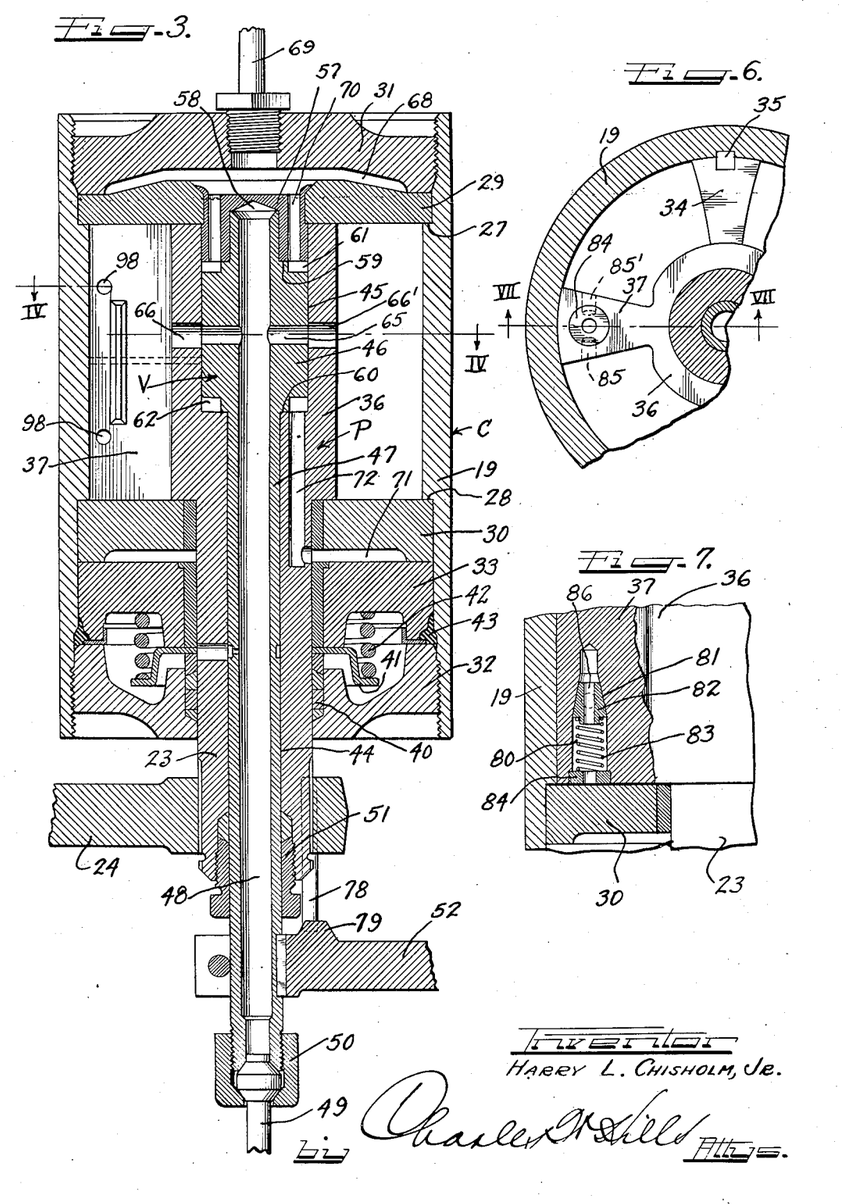
Figure 3 is an enlarged section on plane III—III of Figure 1 and also plane III—III of Figure 4.
Figure 6 is a transverse section of the hydraulic device showing the application of blow-off valves.
Figure 7 is a section on plane VII—VII of Figure 6.

The wall 19 of the cylinder structure C has upper and lower internal shoulders 27 and 28 against which abut the cylinder end or closing walls 29 and 30 respectively. An upper clamping wall 31 has threaded engagement with the end of the cylinder wall for clamping the end wall 29 securely against the shoulder 27. A clamping wall 32 has threaded engagement in the lower end of the cylinder wall 19 and through an intermediate wall 33 exerts pressure against the end wall 30 for holding this end wall securely against the shoulder 28. The cylinder wall 19 and its end walls 29 and 30 define a cylinder space in which the piston structure P operates.

Extending radially from opposite sides of the cylinder wall 19 and between the end walls 29 and 30 are the abutment walls 34 and 34' which may be integral with the end wall 29, and keys 35 may be used for holding the abutments and the end wall against rotational displacement in the cylinder wall 19.

The piston structure P has the hub 36 from which the shaft 23 extends, this hub having vanes 37 and 37', the hub, the vanes, and the abutments 34 and 34', defining hydraulic working chambers 38, 38' and 39, 39'. The piston shaft 23 is journaled in the end wall 30 and the intermediate wall 32, and the lower clamping wall 32 surrounds the shaft and has a recess for suitable packing 40 intimately held to the shaft by a plate 41 under pressure of a spring 42. Packing material 43 is interposed between the clamping wall 32 and the intermediate wall 33 at the peripheries thereof, these packings preventing leakage from the working chambers to the exterior of the hydraulic device.

Figure 2:
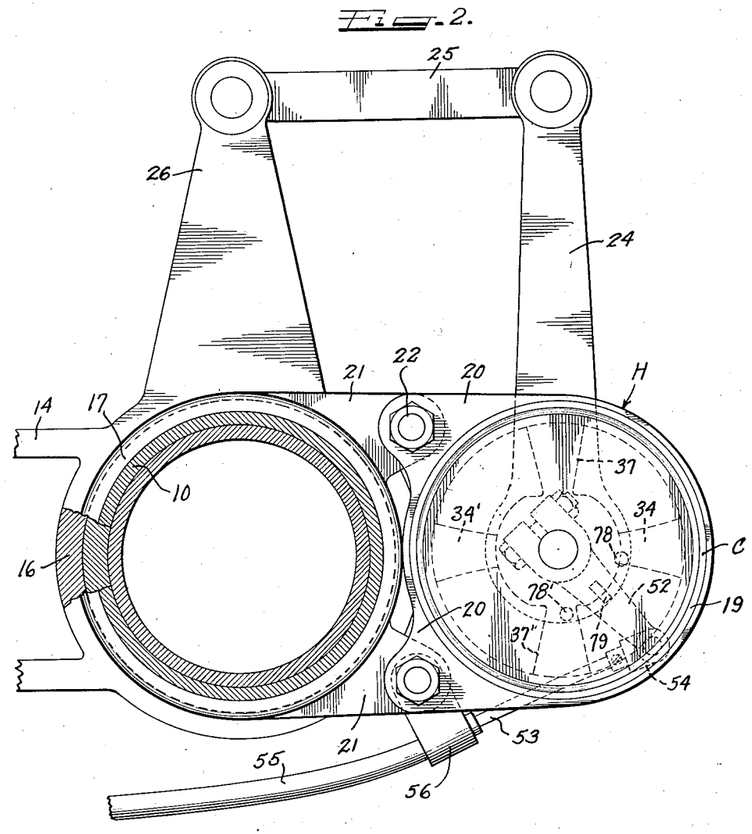
Figure 2 is an enlarged section on plane II—II of Figure 1.

The piston shaft 23 has the bore 44 therethrough communicating at its inner end with a larger bore in the piston hub 36 to form a cylindrical valve chamber 45. Within this bore and valve chamber is the valve structure V whose valve head 46 is operable in the valve chamber with the stem 47 extending therefrom through the bore 44 in the shaft, the valve structure having the bore 48 extending therethrough from one end to the other and communicating at its lower end with a conduit or pipe 49 held to the end of the valve stem by a suitable coupling 50. The valve structure is rotatable relative to the piston structure and a suitable stuffing box 51 in the outer end of the shaft surrounds the valve stem. At its outer end the valve stem has an arm 52 extending therefrom which, as best shown on Figures 1 and 2, has a flexible cable 53 connected to its end by a suitable fitting 54, the cable extending to the cockpit of the airplane for manipulation by suitable means to rotate the valve structure for desired hydraulic control. A guide and protecting sheath 55 is preferably provided for the cable and is seated in and secured to a suitable fitting 56 on the supporting collar 17 for the hydraulic device H.

Extending through an axial opening in the end wall 29 is a plug 57 which projects into the upper end of the valve chamber 45 to provide a bearing for the upper end of the piston hub, the plug having the axial recess 58 receiving the upper end of the valve stem to provide a bearing therefor.

The valve body 46 has upper and lower shoulders 59 and 60 respectively abutting the plug 57 and the piston hub respectively so as to hold the valve structure against axial displacement. Outwardly of these shoulders the valve body is cut away to leave annular channels 61 and 62 respectively.

Figure 4:
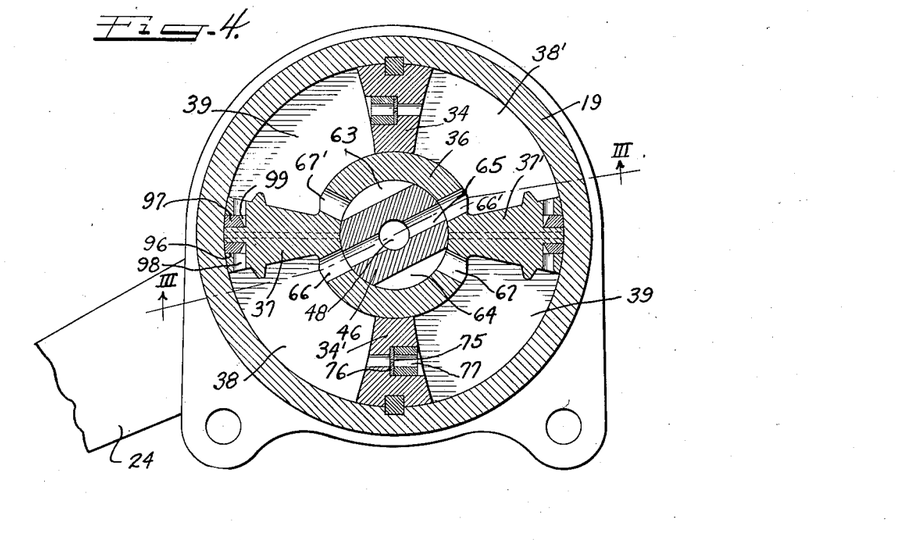
Figure 4 is a section on plane IV—IV of Figure 3, the valve being in one of its steering setting positions.
Figure 5:
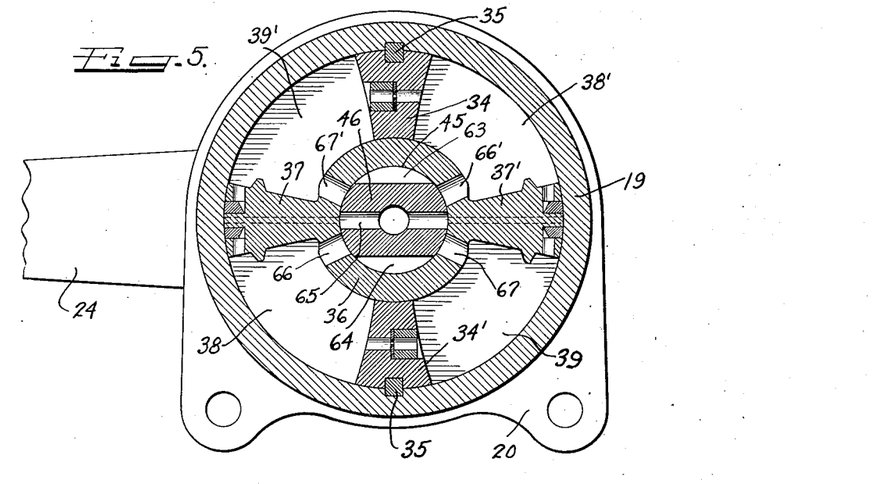
Figure 5 is a section similar to Figure 4 showing the valve in position for shutting off steering producing flow.

Referring to Figures 4 and 5, the valve body on opposite sides thereof is slabbed off to leave segmental spaces 63 and 64 which communicate respectively with the annular channels 61 and 62, the spaces 63 and 64 functioning as valve ports. Extending diametrally through the valve body parallel with the slabbed sides thereof is the port 65 which intersects and communicates with the valve structure bore 48. The hydraulic working chambers 38 and 38' are connected with the valve chamber by passageways 66 and 66' through the piston hub, while the working chambers 39 and 39' are connected with the valve chamber by passageways 67 and 67' respectively as clearly shown on Figs. 4 and 5. These passageways are so spaced that when the valve body is in its neutral or normal position as shown on Fig. 5, the passageways will be shut off from the valve chamber and the valve port 65 will be closed by the piston hub wall. When the valve structure is rotated to a working position, as shown on Fig. 4, the passageways for one set of working chambers will be connected with the valve chamber and the passageways for the other set of working chambers will be in communication with the valve port 65.

The upper clamping wall 31 is recessed in its lower side to leave the closed space 68 between the wall 31 and the end wall 29, a hydraulic fluid flow pipe 69 communicating with this space, and passageways 70 through the plug 57 connecting this space with the annular channel 61 and with the valve ports 63 and 64.

The lower end wall 30 is recessed on its outer side to leave a space 71 between the end wall and the intermediate wall 32, this space communicating with a passageway 72 through the piston shaft and hub which passageway at its upper end communicates with the annular channel 62 and the valve ports 63 and 64. The pipe 69 connects with a source of hydraulic fluid under pressure and during operation of the hydraulic device this hydraulic pressure will be equal in the spaces 68 and 71 against the cylinder end walls 29 and 30 so that the pressure against the inner and outer sides of these end walls is at all times balanced. Referring to Figure 1, the pipe 69 is connected to receive hydraulic fluid under pressure from a source such as a pump S. This may be a separate pump or may be the pump which supplies hydraulic pressure for operation of other controls on the airplane. The pump draws hydraulic fluid from a reservoir R to which the pipe 50 from the hydraulic device H extends. A suitable control valve 73 is preferably included in the pipe 69, and also a check valve 74 for shutting off flow from the hydraulic device through the pipe 69 to the pump.

The opposite valve ports 63 and 64 are always under the same pressure of the fluid flow from the pipe 69 so that the valve structure is balanced radially, and the valve stem at its ends is always subjected to atmospheric pressure of the hydraulic system supply reservoir so that the valve structure is always balanced axially. This balancing of the valve structure makes for ease of operation regardless of applied hydraulic pressure.

Referring to Figure 1, it is assumed that the plane is traveling toward the left, the wheel being in its neutral position, that is, position for straight forward travel of the plane on the ground. With this position of the wheel the valve will be in its neutral position as shown on Figure 5, the valve port 65 being closed and the passageways between the hydraulic working chambers and the valve chamber being shut off by the valve body, the passageway edges being slightly overlapped by the valve body so as to afford a seal against leakage. The hydraulic fluid in the working chambers will now be blocked against any escape and the wheel will be held hydraulically in its neutral or straight forward position. Due to resilience in the piston shaft, the piston shaft lever, and the connecting linkage, a resonant shimmy of the wheel may occur, and in order to prevent straining of the parts, relief passageways may be provided which, as shown on Figs. 4 and 5, may be in the form of orifices 75 in disks 76 interposed in passageways 77 through the piston vanes or, as shown, through the abutments 37 and 37'. This resonant shimmy of the wheel will cause corresponding rotation of the piston structure, but if this shimmy movement is of sufficient magnitude for movement of the piston structure relative to the valve to open the hydraulic working chamber passageways controlled by the valve, then hydraulic fluid under pressure will immediately flow to return the piston structure back to passageway closing position. Referring to Fig. 5, if a shimmy movement of the wheel and the piston structure connected therewith is in clockwise direction a distance beyond the overlap of the passageway edges by the valve body, then hydraulic fluid under pressure will flow from the valve ports 63 and 64 into the working chambers 39' and 39, respectively, and the working chambers 38 and 38' will be connected by the valve port 65 with the bore of the valve stem which bore is connected by a pipe 49 with the reservoir R. Thus the piston vanes will be subjected to pressure for rotation of the piston structure back in counter clockwise direction for reclosure of the passageways and the working chambers so that the further shimmy movement of the wheel will be hydraulically blocked, and thus any attempt to shimmy is hydraulically resisted and stopped.

If it is desired to steer the wheel W, the operator manipulates the cable 53 for swing of the lever 52 for rotary setting of the valve structure. Such setting of the valve structure in either direction from the neutral position will connect the valve ports 63 and 64 for flow of hydraulic fluid under pressure to the corresponding working chambers, and the valve port 65 will connect the other working chambers with the return circuit through the valve stem 48, the pressure against the piston vanes causing the piston structure and the wheel to follow the movements of the valve.

The rotational setting of the valve relative to the piston structure is limited in either direction from its neutral position shown on Figure 5 to a distance which will bring the valve port 65 into full communication with either set of passageways to the working chambers. Such limitation may be accomplished by means of stop pins 78 and 78' extending downwardly from the hub of the lever which is secured to the piston shaft. an abutment 79 on the lever 52 extending from the valve structure being midway between these pins when the valve is in its normal or closed position so that when the valve lever is swung in either direction into engagement with the corresponding stop pin, the valve will be fully open. The valve lever 52 may be adjustable so that it may be set on the valve stem to extend at any angle therefrom when the valve is in its normal position, so that the cable connection to the valve lever may efficiently swing the lever for setting of the valve. The location of the stop pins 78 and 78' on the piston shaft lever must of course then be set so that they will be equi-distances from the valve lever abutment 79 when the valve is in normal position.

Assume now that the pilot desires to steer the wheel towards the left from its forward running position shown on Figure 1. He will then set the valve in counter-clockwise direction as shown on Figure 4. Such setting may be quickly made to the full limit of movement of the valve, or may be more slowly accomplished. If the valve is suddenly set to the position shown on Figure 4, the working chamber passageways with the valve chamber will be quickly opened for fluid flow under pressure from the valve ports 63 and 64 through the passageways 67 and 67' into the working chambers 39 and 39' so that the fluid pressure, acting against the piston vanes, will rotate the piston structure in counter-clockwise direction, and through the lever linkage connection between the piston structure and the wheel fork, the wheel will be turned the corresponding distance toward the left. The quick setting movement of the valve will stop when the valve lever abutment engaged the stop pin 78, and the resulting follow up movement of the piston structure returns the working chamber passageways to a position relative to the valve for closure of the passageways and closure of the valve port 65. If no further setting is then made of the valve, the hydraulic fluid will be locked in the working chambers and the wheel will be held in its steering set position. If further steering movement of the wheel is desired toward the left, the valve is correspondingly set in that direction and the hydraulic fluid under pressure through the open passageways will act against the piston for follow up thereof. For steering in the opposite direction, the valve is set in the corresponding direction and the piston structure and the valve will be caused by hydraulic pressure to follow the valve setting movement.

If the steering is to be more gradual, the valve will be slowly set for more gradual openings of the various passageways and ports so that the wheel will correspondingly follow the valve setting movements for gradual steering movements thereof. Thus, so long as the setting movement of the valve continues, the piston structure and the steering wheel will follow the valve movement for the total available angular rotation of the piston structure in the cylinder structure of the hydraulic device. At the end of each setting movement of the valve, the follow up movement of the piston structure and wheel will effect closure of the various passageways to the working chambers, and closure of the valve port 65, so that the hydraulic device will then function to hold the wheel in its set steering position, and to dampen any shimmy movement thereof in a manner which has already been explained. The restricted orifices 75 for dampening resonant shimmy of small magnitude when the valve is closed. will not require usage of hydraulic fluid from the control system because the fluid in the hydraulic working chambers is entirely enclosed against flow except between adjacent working chambers. A slight loss through these orifices may occur during short periods while the direction of the wheel is being changed in steering, but such slight loss will not materially effect the proper functioning of the hydraulic steering control.

If, while the valve is being set for opening of the various flow passageways for hydraulic follow up of the piston structure and wheel, any obstruction in the path of the wheel, or any shimmy cycle which should tend to turn the wheel further in the direction in which it is being turned by the hydraulic fluid, the valve will be automatically closed. If such shimmy direction of the wheel is in the direction opposite to that in which the wheel is being steered by the hydraulic fluid pressure, such shimmy movement will have to be against the pressure in the working chambers and would be immediately dampened and stopped. Thus the hydraulic device besides functioning as a hydraulic steering motor, will function at all times to dampen out shimmy.

Severe obstruction in the path of the steering wheel when landing might offer undue stress in the working parts of the hydraulic device, and relief or blow-off valves may therefore be provided. These blow-off valves may be located in the hydraulic device abutments or in the piston vanes. Figures 6 and 7 show a form of blow-off valve provided in the vanes. In each vane a valve chamber 80 is provided having a conical seat 81 for a valve 82 in the form of a conical plug which is normally held against the seat by a spring 83 abutting the valve and a disc 84 secured in the end of the valve chamber. Into opposite sides of each vane extend passages 85 and 85' which terminate in the valve chamber 80 at the seat 81 to be normally shut off by the valve plug 82. If now, while the plane is landing or taxiing, the steering wheel is suddenly subjected to a severe deflecting force, and the corresponding movement of the piston structure subjects the hydraulic fluid in the working chambers to abnormal sudden compression, the fluid forced through the passages 85 and 85' will exert sufficient pressure against the conical side of the blow-off valve 82 to shift this valve axially off its seat for relief flow between adjacent working chambers, this blow-off action of the blow-off valve thus protecting the structure against abnormal strain. The blow-off valves are provided with axial passages 86 therethrough so that the pressure at opposite sides of the valves will at all times be equalized for balanced operation of the valve. After a blow-off operation, the valves will immediately be seated by their springs so that the hydraulic device may operate under normal conditions.

Figure 8:
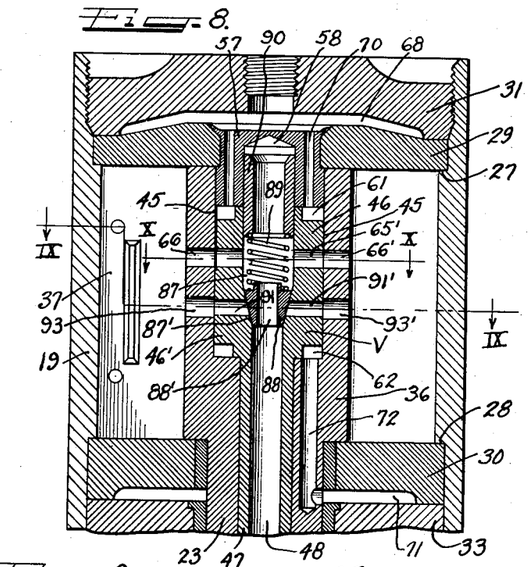
Figure 8 is a section like Figure 3 but showing a modified form of valve assembly.
Figure 9:
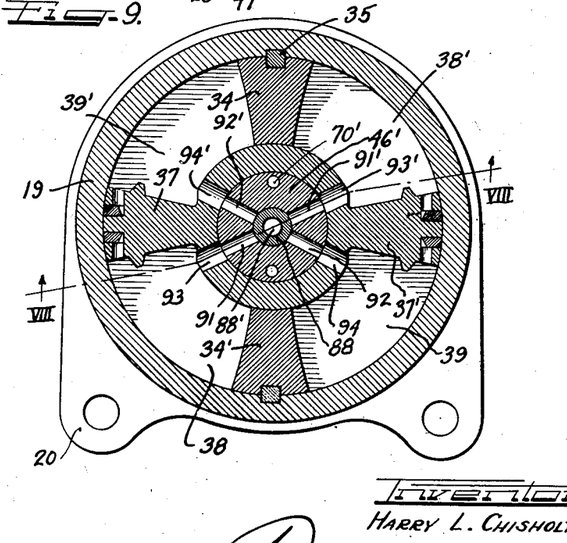
Figure 9 is a section on plane IX—IX of Figure 8.
Figure 10:
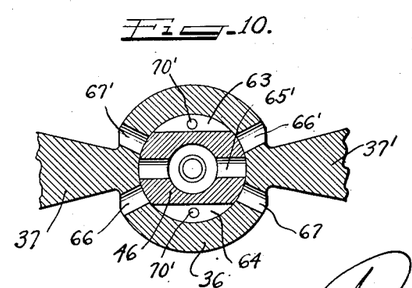
Figure 10 is a section on plane X—X of Figure 8.

Instead of having blow-off valves in the vanes or abutments, a single blow-off valve may be embodied in the main valve structure V, as shown on Figures 8, 9 and 10. In this modified arrangement, the upper portion of the valve body 46 is slabbed off on opposite sides to provide the ports 63 and 64 as in Figures 3, 4 and 5, but the lower portion 46' is cylindrical. The end of the valve bore 48 in the valve stem is widened in the valve body to provide a valve chamber 87, and to provide a conical valve seat 87' in the cylindrical part 46'. A conical valve plug 88 normally engages this seat and is held thereto by a spring 89 which abuts the valve and a tubular plug 90 extending into and seated in the upper end of the valve chamber 87, the plug extending into the recess 58 of the plug 57 secured in the end wall 29, the plug 90 thus forming a bearing support for the valve structure. As was described in connection with the structure on Figure 3, in the structure of Figures 8, 9, and 10 the plug 57 has the passageways 70 connecting the space 68 with the annular channel 61 in the upper end of the valve body, and passageways 70' through the cylindrical part 46' of the valve body connect the valve ports 63 and 64 with the lower annular channel in the valve body which communicates through passageway 72 with the space 71, the spaces 68 and 71 outside of the upper and lower cylinder end walls 29 and 30 being thus always connected with the pressure fluid supply from the pipe 69, as with the structure of Figures 3, 4 and 5. The slabbed upper part of the valve body has the diametrically extending passageway or port 65' which intersects the valve chamber 87 for communication of the valve chamber with the working chambers in the cylinder structure when the valve V is open, the valve plug 88 having the passageway 88' therethrough for flow of fluid from the working chambers into the bore 48 of the valve stem and through pipe 49 back to the reservoir R.

Extending through the cylindrical part 46' of the valve body, from the valve seat 87', are the radial passageways or ports 91 and 91' and 92 and 92', and in the zone of these passageways or ports, passageways 93 and 93' and 94 and 94' are provided in the piston hub for registration with the ports through the valve body part 46' for connection of the respective working chambers with the valve chamber 87, as clearly shown on Figure 9. When the valve 88 is seated, the ports in the valve body part 46' are closed to the valve chamber 87. When the valve 46 is in its fully closed position, as shown on Figure 10, the ports 91, 91' 92 and 92' will be in full registration with the passageways 93, 93', 94 and 94', respectively, as shown on Figure 9, and as the valve 46 is moved toward its fully open position, these ports will be moved out of communication with the passageways.

If, while the valve 46 is in its normal or fully closed position, the steering wheel during landing of the plane or taxiing, encounters a severe obstruction tending to deflect the wheel, the corresponding movement of the piston structure will subject the fluid in the working chambers to such abnormal pressure that the fluid through the ports in the valve body part 46' acting against the conical or inclined surface of the valve plug 88, will shift this valve plug axially upwardly against the resistance of the spring 89 so that the working chambers will be connected with the fluid outflow bore 48 connected with the reservoir which is at atmospheric pressure and the piston structure will be momentarily permitted free movement until the abnormal pressure shock is overcome, when the blow-off valve 48 will again be closed. If the shock was sufficient to turn the steering wheel and piston structure sufficiently to move the valve 46 for exposure of the passageways from the working chamber to the valve ports 63 and 64, then the fluid flow under pressure from the pump will enter the corresponding working chambers to dampen further movement of the piston structure and turn the piston structure in opposite direction until the valve 46 is again in closed position relative to the piston structure. If the deflecting shock on the steering wheel occurs while the valve is being set for steering change, the blow-off valve will momentarily open to relieve the abnormal pressure until the pressure of the hydraulic fluid admitted into the hydraulic device will cause the piston structure to follow the valve setting for reclosure of the valve 46 when setting movement stops.

I also provide simple but efficient means for preventing leakage past the piston of the piston vanes. In the end of each vane are channels 96 which extend radially, and longitudinally the full length of the vane, and in these channels are sealing blades 97 for engaging the inner side of the cylinder wall 19. Ports 98 lead from the working chambers to the channels and the inner ends of the blades are beveled so that the pressure of the hydraulic fluid will hold the blades outwardly in intimate sealing engagement with the cylinder wall.

I thus provide an efficient arrangement for power steering, by a hydraulic motor device, of the steering wheel of an airplane landing gear, with the hydraulic motor functioning also to dampen out shimmy. I have shown a practical and efficient embodiment of the features of my invention, but I do not desire to be limited to the exact construction, arrangement, and operation shown and described, as changes and modifications may be made without departing from the scope of the invention.

I claim as follows:

1. In a unitary rotary hydraulic shock absorber and steering motor in which a vaned piston hub is oscillatable in hydraulic working chambers between the outer and inner end walls of a cylinder and hydraulic abutments therein, a cylindrical valve chamber in the piston hub, a cylindrical valve in said valve chamber, inner and outer abutments for the ends of said valve, outer and inner circumferential channels in the respective ends of said valve, said valve being slabbed off on diametrically opposite sides to provide segmental inlet ports, ports extending through the piston hub between said valve chamber and the hydraulic working chambers at opposite sides of the piston vanes, said piston hub having a shaft extending to the exterior of the cylinder and said valve having a hollow stem extending through said shaft to the exterior thereof, said valve having outlet ports therethrough communicating with the interior of the hollow valve stem, a hydraulic fluid inlet space at the outer end of the cylinder structure having connection with said outer circumferential channel and said segmental inlet ports, said inlet and outlet ports being closed to the hydraulic working chambers when said valve is in neutral position but being opened to said chambers when said valve is rotated in either direction from its neutral position for application of hydraulic pressure to the vanes for hydraulic rotation of the piston to follow the valve movement for reclosure of the inlet and outlet ports when rotation of the valve is stopped, said circumferential channels being connected by said segmental inlet ports whereby both ends of the valve head will be subjected to the fluid inflow pressure for axial balance of the valve.

2. In a unitary rotary hydraulic shock absorber and steering motor in which a vaned piston hub is oscillatable in hydraulic working chambers between the outer and inner end walls of a cylinder and hydraulic abutments therein, a cylindrical valve chamber in the piston hub, a cylindrical valve in said valve chamber, inner and outer abutments for the ends of said valve, outer and inner circumferential channels in the respective ends of said valve, said valve being slabbed off on diametrically opposite sides to provide segmental inlet ports, ports extending through the piston hub between said valve chamber and the hydraulic working chambers at opposite sides of the piston vanes, said piston hub having a shaft extending to the exterior of the cylinder and said valve having a hollow stem extending through said shaft to the exterior thereof, said valve having outlet ports therethrough communicating with the interior of the hollow valve stem, a hydraulic fluid inlet space at the outer end of the cylinder structure having connection with said outer circumferential channel and said segmental inlet ports, said inlet and outlet ports being closed to the hydraulic working chambers when said valve is in neutral position but being opened to said chambers when said valve is rotated in either direction from its neutral position for application of hydraulic pressure to the vanes for hydraulic rotation of the piston to follow the valve movement for reclosure of the inlet and outlet ports when rotation of the valve is stopped, said circumferential channels being connected by said segmental inlet ports whereby both ends of the valve head will be subjected to the fluid inflow pressure for axial balance of the valve, the outer cylinder end wall being subjected to the pressure in said inlet space, a fluid space outside of the inner end wall of the cylinder and a connection from said space through the piston hub to the inner circumferential channel in said valve, whereby the fluid pressure against the outer sides of the cylinder end walls will balance the pressure in the hydraulic chambers against the inner sides of said end walls.

3. In a rotary hydraulic steering motor in which a vaned piston is rotatable in hydraulic working chambers in a cylinder between abutments on the cylinder, a cylindrical valve chamber in the piston hub, a main valve rotatable in said valve chamber, a first zone of flow passageways including ports in said valve and ports in said piston, said passageways being closed to flow when said valve is in a neutral position but being opened when said valve is rotated for flow of fluid for causing rotation of said piston, a second zone of flow passageways including ports in said valve and ports in said piston, a relief valve within said main valve and a spring holding it in position for closure of said second zone passageways against normal fluid pressure when said first zone passageways are closed by said main valve but said spring yielding for movement of said valve to open said second zone passageways during abnormal fluid pressure when said first zone passageways are closed by the main valve.

4. In a rotary hydraulic shock absorber and steering motor in which a vaned piston is rotatable in hydraulic working chambers in a cylinder between abutments on the cylinder, a cylindrical valve chamber in the piston hub, a main valve rotatable in said valve chamber, a first porting zone including inlet and outlet ports in said main valve and inlet and outlet ports through the piston hub for said working chambers, said ports in said first porting zone being closed against flow when said main valve is in a neutral position but being opened for flow of fluid under pressure into working chambers when said valve is rotated in either direction from its neutral position for steering rotation of said piston, a second porting zone including inflow and outflow ports in said main valve and inflow and outflow ports in the piston hub for said working chambers, an axially shiftable relief valve within said main valve, and spring means holding said valve closed to shut off flow through said second porting zone during normal fluid pressure in said working chambers when said first porting zone is closed against flow by said main valve, said spring yielding to abnormal fluid pressure in said working chambers to permit unseating of said relief valve for relief flow through said second porting zone.

5. In a rotary hydraulic shock absorber and steering motor in which a vaned piston is rotatable in hydraulic working chambers in a cylinder between abutments on the cylinder, a cylindrical valve chamber in the piston hub, a main valve rotatable in said valve chamber, a first porting zone including inlet and outlet ports in said main valve and inlet and outlet ports through the piston hub for said working chambers, said ports in said first porting zone being closed against flow when said main valve is in a neutral position but being opened for flow of fluid under pressure into working chambers when said valve is rotated in either direction from its neutral position for steering rotation of said piston, a second porting zone including outflow ports in said main valve and ports in the piston hub for said working chambers, a fluid outflow passageway in said main valve to the exterior of the cylinder, a relief valve within said outflow passageway, and spring means normally holding said relief valve seated to shut off flow through said second porting zone under normal hydraulic pressure in said working chambers when said first porting zone is closed by said main valve when in its neutral position, said spring means yielding to abnormal fluid pressure in said working chambers for unseating of said relief valve by the abnormal pressure for opening of said second porting zone to relieve flow from said working chambers into said outflow passageway until the hydraulic pressure again becomes normal.

6. In a rotary hydraulic shock absorber and steering motor in which a vaned piston is rotatable in hydraulic working chambers in a cylinder between abutments on the cylinder, a cylindrical valve chamber in the piston hub, a main valve rotatable in said valve chamber, a first porting zone including inlet and outlet ports in said main valve and inlet and outlet ports through the piston hub for said working chambers, said ports in said first porting zone being closed against flow when said main valve is in a neutral position but being opened for flow of fluid under pressure into working chambers when said valve is rotated in either direction from its neutral position for steering rotation of said piston, a second porting zone including outflow ports in said main valve and ports in the piston hub for said working chambers, a fluid outflow passageway in said main valve to the exterior of the cylinder, and a relief valve interposed in said outflow passageway and spring means for holding said relief valve seated to shut off flow through said second porting zone during normal fluid pressure conditions in said working chambers while said main valve is in neutral position to close the said first porting zone, said spring means yielding to abnormal pressure conditions for unseating of said relief valve by the abnormal pressure for opening of said second porting zone for flow of fluid from said hydraulic working chambers into said outflow passageway until normal pressure is reestablished, said relief valve having a passageway therethrough for outflow of fluid through said first porting zone into said outflow passageway during seating of said relief valve and movement of said main valve out of its normal position.

7. In a rotary hydraulic shock absorber and steering motor in which a vaned piston is rotatable in hydraulic working chambers in a cylinder between abutments on the cylinder, a cylindrical valve chamber in the piston hub, a main valve rotatable in said valve chamber, a first porting zone including inlet and outlet ports in said main valve and inlet and outlet ports through the piston hub for said working chambers, said ports in said first porting zone being closed against flow when said main valve is in a neutral position but being opened for flow of fluid under pressure into working chambers when said valve is rotated in either direction from its neutral position for steering rotation of said piston, a second porting zone including ports in said main valve and ports through the piston hub which ports are in register when said main valve is in neutral position, a relief valve within said main valve, and spring means seating said relief valve to shut off flow through said second zone when the pressure in said working chambers is normal but responding to abnormal pressure for unseating of the relief valve by the abnormal pressure for flow between working chambers to relieve the abnormal pressure.

HARRY L. CHISHOLM, JR.